United States Patent [19]
Kimura et al.

[11] Patent Number: 5,924,538
[45] Date of Patent: Jul. 20, 1999

[54] LEVER SUPPORT DEVICE FOR CLUTCH COVER ASSEMBLY

[75] Inventors: Hiroshi Kimura, Neyagawa; Yasushi Takehira, Kobe; Shinichi Noda, Neyagawa, all of Japan

[73] Assignee: EXEDY Corporation, Neyagawa, Japan

[21] Appl. No.: 08/841,589

[22] Filed: Apr. 30, 1997

[30] Foreign Application Priority Data

May 14, 1996 [JP] Japan ..................................... 8-118804

[51] Int. Cl.⁶ ..................................................... F16D 13/58

[52] U.S. Cl. .................. 192/99 A; 192/89.26; 192/70.29; 192/110 R; 192/112

[58] Field of Search .............................. 192/99 A, 89.26, 192/111 B, 70.29, 112, 110 R

[56] References Cited

U.S. PATENT DOCUMENTS 2,773,576  12/1956  Stenger ............................. 192/99 A X

*Primary Examiner*—Charles A Marmor
*Assistant Examiner*—Saul Rodriguez
*Attorney, Agent, or Firm*—Shinjyu An Intellectual Property Firm

[57] ABSTRACT

A lever support device for a clutch cover assembly is disclosed, and includes a lever support 16 having a threaded portion 16a at its end portion, a support nut 17 engaged with the threaded portion 16a of the lever support 16 and fitted with the clutch cover 11, a lock plate 18 having an engagement portion 18a engaged with the outer periphery of the support nut 17, at least one oblong mounting aperture 18b in the lock plate 18 which inhibits rotation of the support nut 17, and a fixing member 19 inserted into the mounting aperture 18b in the lock plate 18 with a space 30 for rotation of the lock plate therebetween.

10 Claims, 3 Drawing Sheets

LEVER SUPPORT DEVICE FOR CLUTCH COVER ASSEMBLY

BACKGROUND OF THE INVENTION

A. Field of the Invention

The present invention relates to a lever support device for a clutch cover assembly.

B. Description of the Background Art

A clutch device typically includes a clutch cover assembly for pressing and releasing a clutch disk against a flywheel. The clutch cover assembly has a pressure plate for holding the clutch disk between it and the flywheel, and a diaphragm spring or coil springs for biasing the pressure plate against the clutch disk. These members are disposed inside a clutch cover fixed to the flywheel.

In the clutch cover assembly provided with coil springs, a plurality of levers are employed for releasing the pressure plate from the clutch disk. These levers are supported by the clutch cover via lever support devices.

A conventional lever support device has a lever support for supporting the lever, a support nut engaged with the clutch cover, a lock plate for locking and fixing the support nut to the clutch cover, and a bolt for fixing the lock plate to the clutch cover. The support nut is engaged with a threaded portion at the end of the lever support, and has a polygonal outer periphery. The lock plate has a lock aperture through which the support nut is inserted, a bolt aperture for mounting, and a plurality of claws at the outer periphery of the lock aperture which engage with the outer periphery of the support nut.

In this clutch cover assembly, it is necessary to reduce the difference in height (or position in the axial direction of the levers) between the levers in order to reduce pedal vibration and judder in the clutch. For adjusting lever heights, the support nut is rotated in one or the other direction so as to adjust the axial position of the lever support engaged with the support nut. After the lever height is adjusted, the periphery of the lock aperture in the lock plate is engaged with the outer periphery of the support nut, and the lock plate is fixed to the clutch cover by the bolt. Thereby, the support nut is prevented from loosening.

In adjusting the lever height, the angular position of the lock plate is fixed by the position of the bolt apertures, i.e., the aperture for mounting and the claws around the lock aperture, so that the adjustment of the lock plate with respect to the clutch cover cannot be performed with a high degree of efficiency. Further, the angular position of the support nut can only be adjusted stepwise and corresponding to an angular space between the claws around the lock aperture, and thus fine or minute adjustment thereof is difficult.

SUMMARY OF THE INVENTION

An object of the invention is to provide a lever support device which allows fine adjustment of a lever height, and which can be efficiently adjusted.

According to a first aspect of the invention, a lever support device for a clutch cover assembly is mounted on a clutch cover, and supports a lever for releasing a pressure plate from a clutch disk. The lever support device includes a lever support, a support nut, a lock plate and a fixing member.

The lever support further includes a threaded portion at its end portion. The support nut is engaged with the threaded portion of the lever support, and both are fitted to the clutch cover. The lock plate is provided for inhibiting the rotation and axial movement of the support nut, and includes an engagement portion and an oblong mounting aperture. The engagement portion is engaged with the outer periphery of the support nut. The fixing member is provided for fixing the lock plate to the clutch cover, and is inserted into the mounting aperture in the lock plate such that there is a space for rotation of the lock plate therebetween.

In this device, the height of the lever can be adjusted by tightening or loosing the support nut. For fixing the support nut after adjustment of the lever height, the engagement portion of the lock plate is engaged with the outer periphery of the support nut, and is fixed to the clutch cover by the fixing member, such as a bolt.

In fixing the lock plate to the clutch cover by the fixing member, a larger degree of freedom in the angular position of the lock plate can be achieved. This is due to the space for rotation formed between the fixing member and the inter periphery of the mounting aperture in the lock plate. Even if the lock plate is angularly shifted by an angle corresponding to the space for rotation, the fixing member can fix the lock plate to the clutch cover, resulting in an improved degree of efficiency in operation. The angular position of the support nut can be freely fixed within a range corresponding to the space for rotation, so that the lever height can be adjusted more finely than the prior art. Therefore, the difference in height between the levers can be reduced, and judder and pedal vibration can be suppressed.

According to a second aspect of the invention, two mounting apertures are formed on opposing sides of the engagement portion in the lock plate. Each of these mounting apertures has an oblong form which partially extend around the engagement portion.

According to a third aspect of the invention, there is only one mounting aperture in the lock plate, located at one side of the engagement portion. This mounting aperture has an oblong form which partially extends around the engagement portion.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
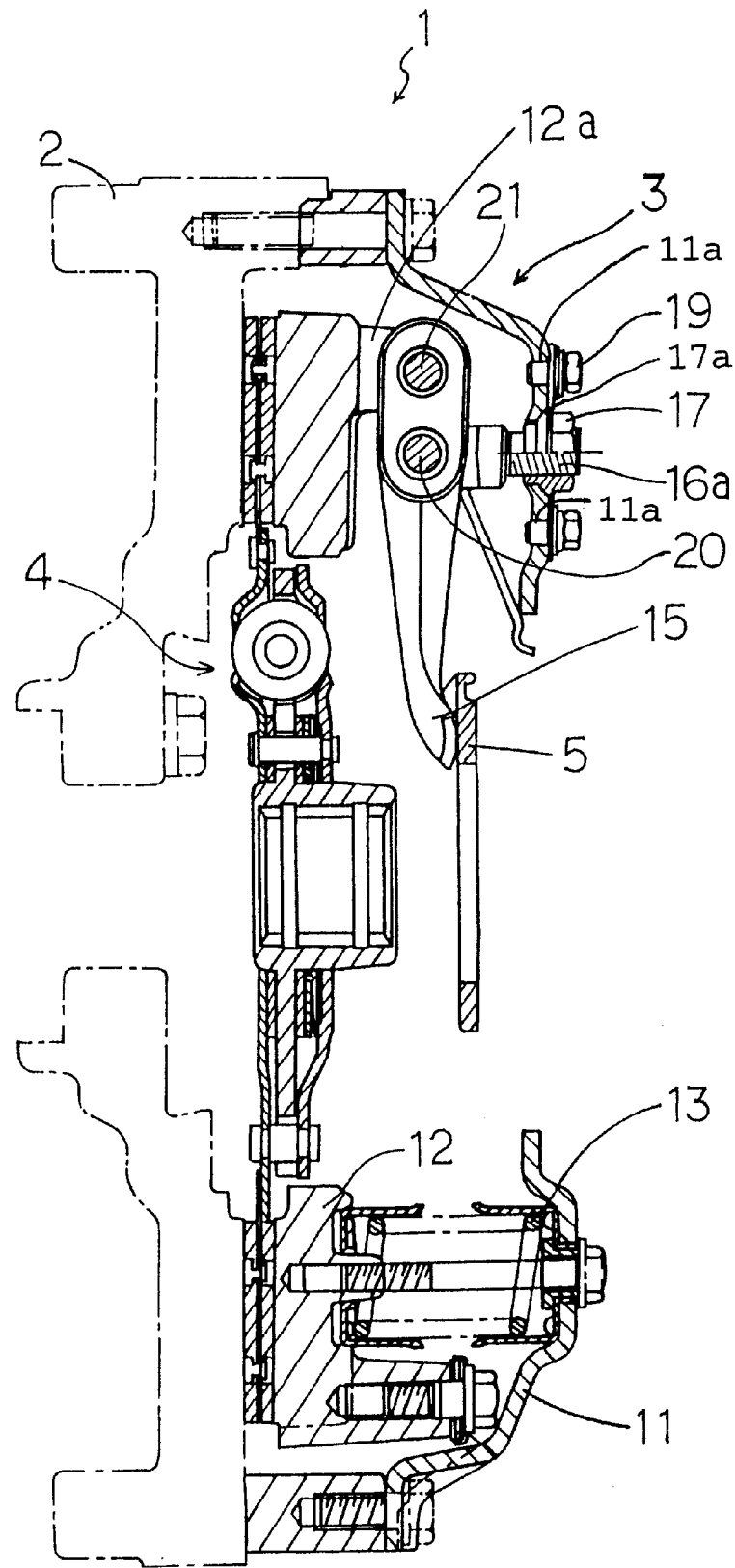
FIG. 1 is a schematic cross section of a clutch assembly according to one embodiment of the invention.

FIG. 1 shows a clutch device 1 employing one embodiment of the invention. The clutch device 1 can operate to transmit and interrupt torque from a flywheel 2 of an engine (not shown) to a transmission input shaft (not shown). The clutch device 1 includes the flywheel 2, a clutch cover assembly 3 and a clutch disk assembly 4.

The clutch cover assembly 3 has, as shown in FIG. 1, a clutch cover 11 fixed to the flywheel 2, a pressure plate 12 which is fixed to the clutch cover 11 so as to be unrotatable but axially movable thereto by strap plates 14, a plurality of coil springs 12 for pressing the pressure plate 12 against the flywheel 2, and a plurality of levers 15 supported by the clutch cover 11 for releasing a pressing force of the pressure plate 12.

The pressure plate 12 has a frictional surface opposed to a friction member of the clutch disk assembly 4, and has a plurality of projections 12a at its rear side opposite to the friction surface (i.e., the side facing the transmission). The projections 12a rotatably support levers 15 by means of pins 21. The coil spring 13 is disposed between the clutch cover 11 and the pressure plate 12, and applies a predetermined load against the pressure plate 12. One end of each lever 15 near the center of the clutch cover assembly can be brought into contact with a release member 5. When the release member 5 is moved toward the engine, the pressure plate 12 is pulled toward the clutch cover 11 via the lever 15.

Figure 2:
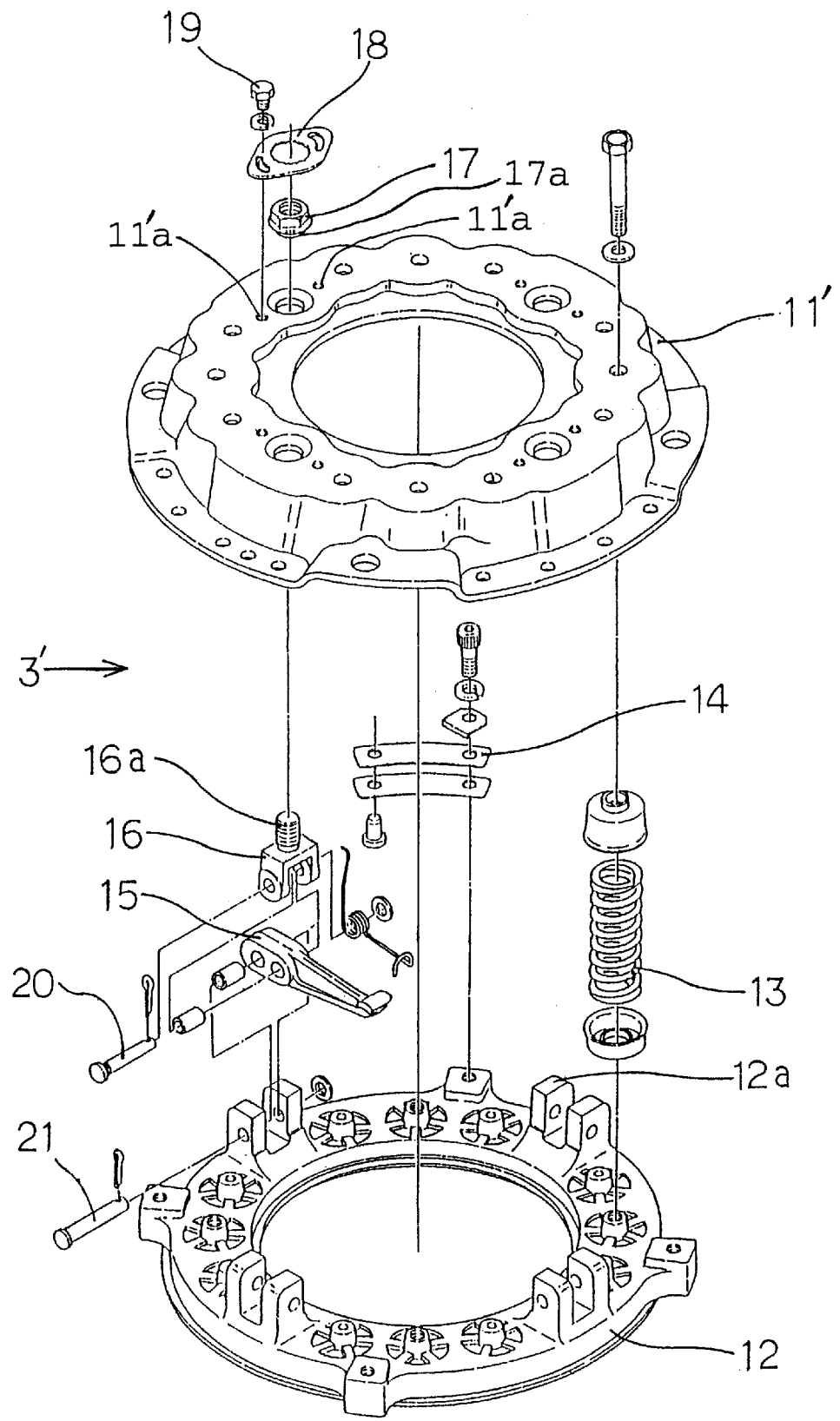
FIG. 2 is a perspective view of a portion of another clutch assembly similar to the clutch assembly depicted in FIG. 1.
Figure 3:
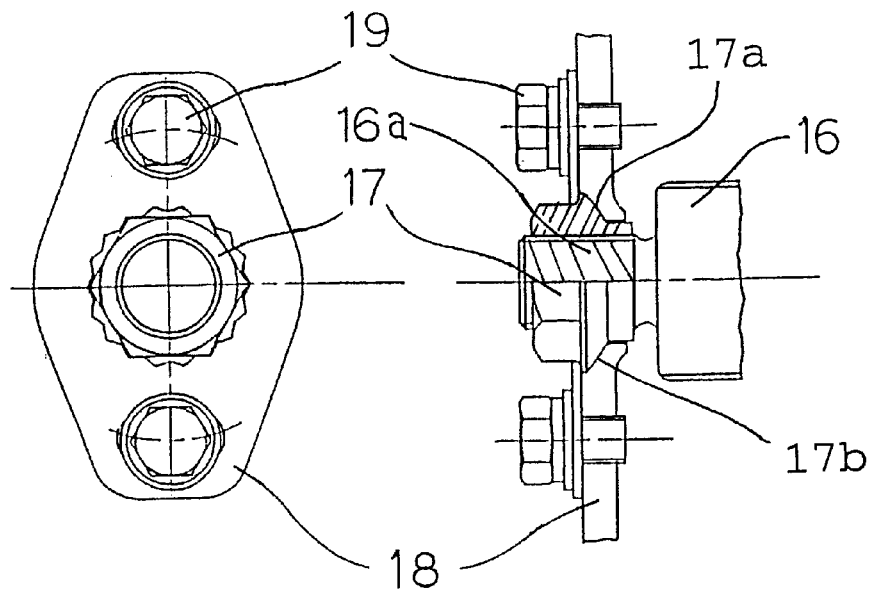
FIG. 3 shows portions of a lever support device for the clutch assemblies depicted in FIGS. 1 and 2.
Figure 4:
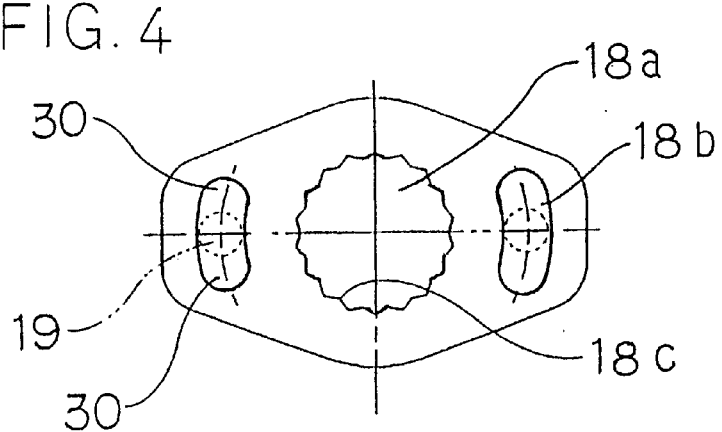
FIG. 4 is a plan view of a lock plate depicted in FIG. 3.

Each lever 15 is supported by the clutch cover 11 via a lever support device including a lever support 16, a support nut 17 and a lock plate 18. The lever support 16 is rotatably coupled to the lever 15 via a pin 20. The lever support 16 has an external thread 16a at its free end, which extends through an aperture formed at the clutch cover 11 and is engaged with the support nut 17. The support nut 17 is engaged with the aperture formed at the clutch cover 11, and has a hexagonal outer periphery. The lock plate 18 is a substantially square plate member having a wide central portion, as shown in FIGS. 2 to 4, and has a lock aperture 18a at its center and a pair of bolt apertures 18b for mounting formed at its opposite end portions. The support nut 17 can be inserted through the lock aperture 18a. Claws 18c engaging with the outer periphery of the support nut 17 are formed at the inner periphery of the aperture 18a. Each bolt aperture 18b has an oblong form extending circularly around the center of the lock aperture 18a, and is adapted to leave spaces 30 for rotation between the inner periphery of the aperture 18b and the bolt 19 inserted therethrough.

Because of the above structure, the position of the fixed lock plate 18 with respect to clutch cover 11 is not restricted to only one position, and the degree of freedom in its position is increased. As is shown in FIG. 1, the bolts 19 which retain the locking pate 18 on the clutch cover 11, are disposed on opposite sides of the support nut 17. Further, the bolts 19 are on radially opposite sides of the support nut 17, with one bolt 19 disposed on a radially inward side of the support nut 17 and one bolt 19 disposed on a radially outward side of the support nut 17. The clutch cover 11 is formed with circumferentially spaced apart apertures through which external thread 16a extends. Bolt holes 11a for receiving the bolts 19 are formed in the clutch cover 11 on opposite radial sides of the apertures which receive the external thread 16a of the lever supports 16.

As can be seen in FIGS. 1 and 3, the support nut 17 is formed with an annular lip 17a. The annular lip 17a has a diameter that is larger than the opening of a lock aperture 18a formed in the locking plate 18. The annular lip 17a is formed at one end of a conical-shaped surface 17b formed on the support nut 17, as is more clearly seen in FIG. 3.

In a second embodiment of the present invention depicted in FIG. 2, a clutch cover assembly 3' is generally the same as that depicted in FIG. 1 and includes all of the elements and features of the clutch cover assembly 3, except that the clutch cover 11' in FIG. 2 has a slightly different configuration for receiving the bolts 19. Specifically, in FIG. 2, the clutch cover 11' includes the circumferentially spaced apart apertures for receiving the external thread 16a of the lever supports 16. However, bolt holes 11'a for receiving the bolts 19 are circumferentially aligned rather than being radially aligned, as is the case in FIG. 1. Therefore, as shown in FIG. 2, the bolts 19 and bolt holes 11'a are generally circumferentially aligned about a center of the clutch cover 11'.

In each of the two embodiments defined: in FIGS. 1 and 2, the levers 15 must maintain the equal vertical height or level, as is more clearly shown in FIG. 2. If a difference in height were present between the levers, the pressing force by the pressure plate 12 would locally increase when the clutch was disengaged by pulling away the pressure plate 12 by the levers 15, resulting in pedal vibration and judder. Therefore, the heights of the levers 15 must be individually adjusted.

The manner of adjusting the heights of levers 15 will now be described. It should be understood that the description of the adjustment of the heights of levers 15 is applicable to each of the embodiments depicted in FIGS. 1 and 2. The description of the first embodiment with the clutch cover 11 is likewise applicable to the clutch cover 11' in FIG. 2.

The height of each lever 15 can be adjusted by tightening or loosening the support nut 17. By tightening the support nut 17, the lever support 16 moves toward the clutch cover 11, and the lever 15 pivots around the pin 21. Thus, the end (radially inner end) of the lever 15 moves toward the clutch cover 11. A circumferentially extending surface defined by the annular lip 17a engages the locking plate 18, as is shown in FIGS. 1 and 3. Therefore, by loosing the support nut 17, the end of the lever 15 moves toward the pressure plate 12 since the locking plate is fixed to the clutch cover 11 by the bolts 19.

After the lever height is adjusted in this manner, the lock plate 18 is attached to the support nut 17 to engage the claws 18c around the lock aperture 18a with the outer periphery of the support nut 17. Then, the lock plate 18 is fixed to the clutch cover 11 by the bolts 19, and the rotation of the support nut 17 is thereby inhibited. In addition, the support nut 17 held between the lock plate 18 and the clutch cover 11 is inhibited from axial movement. In this manner, the lever 15 is supported by the clutch cover 11 via the lever support 16. In the above operation, the degree of freedom in the angular position of the lock plate 18 can be increased corresponding to the angular spaces 30 for rotation which are present between the bolts 19 and the inner periphery of the bolt apertures 18b in the lock plate 18. More specifically, in contrast to the prior art in which the lock plate 18 can be fixed only at one restricted angular position, this embodiment allows the rotation of the lock plate 18 by an angle corresponding to the spaces 30 before fixing the same, even if the lock plate 18 engaged with the support nut 17 was angularly shifted.

Since the fixing angle of the lock plate 18 is not restricted as described above, the degree of freedom in the angular position of the support plate 17 can be large, and the lever height can be adjusted finely and minutely.

Figure 5:
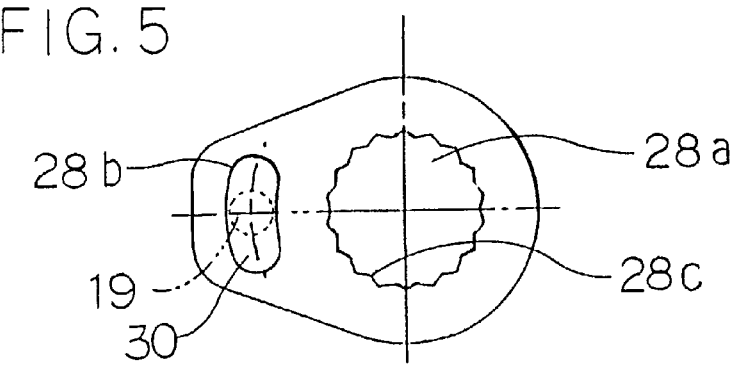
FIG. 5 is a plan view of a lock plate according to another embodiment of the invention.

In another embodiment of the invention, the lock plate 18 described above can be replaced with a lock plate 28 (shown in FIG. 5), and is engaged with the support nut 17 for fixing the structure to the clutch cover 11.

The lock plate 28 is a plate in which one side is wider than the other side, and has a lock aperture 28a formed at the wide portion and a bolt aperture 28b for mounting formed at the other portion. The support nut 17 can be inserted into the lock aperture 28a, and is provided at the inner periphery of the aperture 28a with claws 28c engageable with the outer periphery of the support nut 17. The bolt aperture 28b has an oblong form extending circularly around the center of the lock aperture 28a, and is adapted to leave the spaces 30 for rotation between the inner periphery of the aperture 28b and the bolt 19 inserted therethrough.

According to the invention, as described above, since the bolt aperture in the lock plate has an oblong form, the position of the lock plate fixed to the clutch cover is not restricted. This improves the efficiency of the lever height adjusting operation during assembly, and allows finer adjustment of the lever height than the prior art, in which the minimum adjustable unit is restricted by the form of the support plate and the form of the engagement portion of the lock plate. Thus, judder and pedal vibration in the clutch can be reduced.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A lever support device mounted on a clutch cover of a clutch cover assembly, said lever support device supporting a lever for releasing a pressure plate from a clutch disk, said lever support device comprising:

a lever support having a threaded portion at one end thereof, said lever support supporting said lever;

a support nut engaged with said threaded portion of said lever support, said lever support and said support nut fitted to said clutch cover;

a lock plate having an engagement portion and at least one oblong mounting aperture, said engagement portion engaged with the outer periphery of said support nut and said lock plate inhibiting rotation and axial movement of said support nut; and a fixing member inserted into each of said mounting apertures in said lock plate, said fixing member fixing said lock plate to said clutch cover.

2. The lever support device according to claim 1, wherein two mounting apertures are formed on opposing sides of said engagement portion in said lock plate, and both of said mounting apertures have an oblong form which partially extend around said engagement portion.

3. The lever support device according to claim 1, wherein one mounting aperture is formed on a side of said engagement portion in said lock plate, and said mounting aperture has an oblong form which partially extends around said engagement portion.

4. The lever support device according to claim 1, wherein said support nut is formed with an annular lip and said lock plate engages said annular lip thus inhibiting axial movement of said support nut.

5. A lever support device mounted on a clutch cover of a clutch cover assembly, the lever support device supporting a lever for releasing a pressure plate from a clutch disk, said lever support device comprising:

a lever support having a threaded portion at one end thereof, said lever support supporting said lever;

a support nut engaged with said threaded portion of said lever support, said lever support, said support nut being formed with an annular lip, said support nut being further configured for engagement with the clutch cover;

a lock plate having an engagement portion and two mounting apertures formed on opposite sides of said engagement portion, said mounting apertures each have an arcuate shape which partially extends around said engagement portion, said engagement portion configured for engagement with an outer periphery of said support nut and said annular lip such that said lock plate inhibits rotation and axial movement of said support nut; and a bolt member inserted into each of said mounting apertures in said lock plate fixing said lock plate to the clutch cover.

6. A clutch cover comprising:

a pressure plate;

at least one lever connected to said pressure plate for pivotal movement with respect thereto;

at least one lever support having a threaded portion at one end thereof, said lever support supporting a portion of said lever for pivotal movement with respect thereto;

a clutch cover having a plurality of circumferentially spaced apart first apertures formed therein, said threaded portion extending through one of said first apertures;

a support nut engaged with said threaded portion of said lever support, said lever support and said support nut fitted to said clutch cover;

a lock plate having an engagement portion and a pair of mounting apertures formed on opposite sides of said engagement portion, each of said pair of mounting apertures having an arcuate shape at least partially extending around said engagement portion, said engagement portion being configured for engagement with an outer periphery of said support nut and said lock plate inhibiting rotation and axial movement of said support nut; and a pair of bolts inserted into each of said mounting apertures in said lock plate fixing said lock plate to said clutch cover.

7. The clutch cover as set forth in claim 6, wherein said clutch cover is formed with a first aperture through which said threaded portion of said lever support extends, and said clutch cover is further formed with a pair of bolt holes adjacent to said first aperture for receiving said bolts fixing said lock plate to said clutch cover.

8. The clutch cover as set forth in claim 7, wherein said pair of bolt holes are formed on opposite radial sides of said first aperture.

9. The clutch cover as set forth in claim 7, wherein said pair of bolt holes are formed on opposite circumferential sides of said first aperture.

10. The clutch cover as set forth in claim 6, wherein said support nut is formed with an annular lip and said lock plate engages said annular lip thus inhibiting axial movement of said support nut.

* * * * *